United States Patent
Ozaki

[11] 3,714,933
[45] Feb. 6, 1973

[54] AUTOMATIC TEMPERATURE CONTROL DEVICE FOR INTAKE AIR OF AN INTERNAL COMBUSTION ENGINE

[75] Inventor: Masaaki Ozaki, Wako, Japan

[73] Assignee: Honda Giken Kogyo Kabushiki Kaisha, Tokyo, Japan

[22] Filed: Nov. 11, 1971

[21] Appl. No.: 197,687

[30] Foreign Application Priority Data

Nov. 16, 1970 Japan..............................45/100141

[52] U.S. Cl. ............................................123/122 D
[51] Int. Cl...F02m 23/14, F02m 15/00, F02m 31/08
[58] Field of Search...................123/122 R, 122 D, 122 C, 122 B, 123/122 H

[56] References Cited

UNITED STATES PATENTS 3,394,687   7/1968   Scott.............................123/122 D X

*Primary Examiner*—Al Lawrence Smith
*Attorney*—Eric H. Waters et al.

[57] ABSTRACT

An automatic temperature control device for intake air of an internal combustion engine comprises a control valve for adjusting the ratio of the amount of cool air and hot air each supplied into the interior of the intake pipe of the engine so as to control the temperature of intake air, and a negative pressure motor for operation of said control valve which negative pressure chamber is, on one hand, in conjunction with the interior of the intake pipe downstream of a throttle valve, and is, on the other hand, opened into the atmosphere through a temperature sensitive valve being operatable according to variation of the temperature of the engine or an adjacent point thereof. The air passage between the negative pressure chamber of the negative pressure motor and the interior of the intake pipe has an one-way valve and two invariable orifices on its way. The one-way valve permit air to pass through the air passage just from the negative pressure chamber of the negative pressure motor to the interior of the intake pipe, and one of the invariable orifices is interposed between the one way valve and the intake pipe, while the other makes the air passage between said one-way valve and said other invariable orifice open into the atmosphere.

2 Claims, 1 Drawing Figure

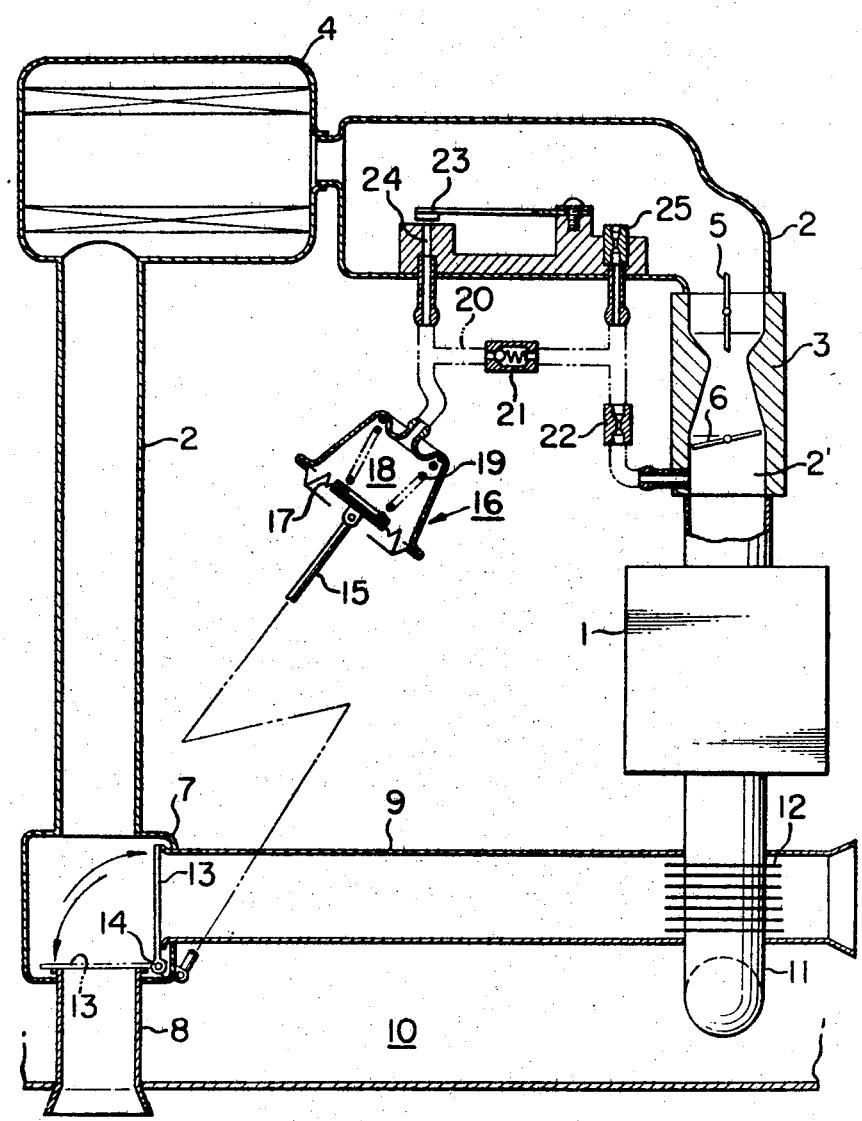

AUTOMATIC TEMPERATURE CONTROL DEVICE FOR INTAKE AIR OF AN INTERNAL COMBUSTION ENGINE

BRIEF SUMMARY OF THE INVENTION

The present invention relates to an automatic temperature control device for intake air of an internal combustion engine which is able to keep the temperature of intake air supplied into the interior of the intake pipe of the engine at constant temperature as far as possible so as to improve the efficiency of the engine.

In conventional device, it comprises a control valve for adjusting the ratio of the amount of cool air and hot air each supplied into an engine as intake air, a negative pressure motor mechanically connected to the control valve, which is operated both by negative pressure in the interior of the intake pipe of the engine in back of a throttle valve and by atmospheric pressure led through a temperature sensitive valve responsive to the temperature of the engine, to correct negative pressure acting on the negative pressure motor according to variation of the temperature of intake air. Thus, the control valve is operated responsively to the temperature in the interior of the intake pipe of the engine.

However, operative negative pressure acting on the negative pressure motor will be lowered to operate the negative pressure motor irrelatively to operation of the temperature sensitive valve when the throttle valve is opened rapidly, i.e. on warming-up operation after starting operation of the engine in cold condition, because the negative pressure motor is operated by negative pressure of intake air in the interior of the intake pipe of the engine. Accordingly, controlling of intake air temperature with mixing of cool air and hot air is not carried out properly.

Therefore, one object of the present invention is to improve a conventional device as described above by keeping negative pressure acting on the negative pressure motor at constant high negative pressure irrelatively to rapid opening of the throttle valve just at a temperature below the temperature at which the temperature sensitive valve begins to operate.

Another object of the present invention is to provide an automatic temperature control device for intake air of an internal combustion engine of which negative pressure motor is operated responsively only to temperature of intake air supplied into the interior of the intake pipe of the engine irrelatively to rapid opening operation of the throttle valve thereof.

Further object of the present invention is to provide an automatic temperature control device for intake air of an internal combustion engine of which negative pressure motor is smoothly affected even by extremely low negative pressure in the interior of the intake pipe of the engine.

According to the present invention, an automatic temperature control device for intake air of an internal combustion engine has an air passage which has an one-way valve at an intermediate portion thereof so that it permit air to pass therethrough just from the negative pressure chamber of a negative pressure motor to the interior of an intake pipe downstream of a throttle valve.

The device according to the present invention also has the first invariable orifice interposed in said air passage between said one-way valve and the intake pipe, and the second invariable orifice which makes the air passage between the one-way valve and said first invariable orifice open into the atmosphere therethrough.

BRIEF DESCRIPTION OF THE DRAWING

The drawing annexed hereto shows a schematic sectional view of an automatic temperature control device for intake air of an internal combustion engine as an embodiment of the present invention.

DETAILED DESCRIPTION

Referring to the drawing, an intake pipe 2 connected to an internal combustion engine 1 has a carburetor 3 in which a choke valve 5 and a throttle valve 6 are pivotally supported and an air cleaner 4.

A confluence 7 at the end portion of the intake pipe 2 has two conduit pipes, i.e., a cool air conducting pipe and a hot air conducting pipe. The pipe 8 is elongated into the outer space of an engine room 10 to conduct cool atmosphere therefrom to the intake pipe 2, while the pipe 9 is opened into the atmosphere, crossing with the heat exchanger 12 settled on the exhaust pipe 11 of the engine 1 at the intermediate portion thereof, to conduct heated atmosphere therefrom to the intake pipe 2.

At the corner of the confluence 7, a control valve 13 is supported turnably about a pivot 14 to be able to shut the inner opening of the pipes 8 and 9 alternatively.

The root portion of the control valve 13 is mechanically connected to the outer surface of the diaphragm 17 of a negative pressure motor 16 with a connecting rod 15 as described later.

The negative pressure motor 16 has a compression spring 19 in its negative pressure chamber 18 to enforce the diaphragm 17 outwards.

The negative pressure chamber 18 of the negative pressure motor 16 is in connection with the interior of the intake way 2' of the intake pipe 2 downstream of the throttle valve 6 through an air passage 20 to be affected with negative pressure of intake air. The air passage 20 has an one-way valve 21 to permit air to pass therethrough from the negative pressure motor 16 to the carburetor 3 and the first invariable orifice 22 for throttling negative pressure air passing therethrough on its way.

The air passage 20 between the negative pressure motor 16 and the one-way valve 21 is opened into the atmosphere at the opening 24 thereof which is adjustably closed by a temperature sensitive valve 23, e.g., bimetallic plate, to be closed at a low temperature and opened at a high temperature.

Moreover, the air passage 20 between the one-way valve 21 and the first invariable orifice 22 is opened into the atmosphere through the second invariable orifice 25.

The temperature of intake air supplied into the intake pipe 2 of the engine 1 is controlled with adjusting the mixing ratio of the amount of cool air supplied into the intake pipe 2 from the conduit pipe 8 and hot air supplied into the intake pipe 2 from the conduit pipe 9. Thus, the temperature of intake air will rise if the control valve 13 is turned counterclockwise about the pivot 14 and will fall if the control valve 13 is turned clockwise about the pivot 14.

If the engine 1 is started when the temperature sensitive valve 23 has closed the opening 24 because of low temperature of circumstances of the engine 1, extremely low negative pressure is generated behind the throttle valve 6 which has been in shutting position and instantaneously affects the negative pressure chamber 18 of the negative pressure motor 16 to suck the diaphragm 17 inwards to turn the control valve 13 counterclockwise. Accordingly hot air is supplied from the conduit pipe 9 to the intake pipe 2 to elevate the temperature of intake air. In this case, the temperature sensitive valve 23 opens the opening 24 according to rising of the temperature of intake air to adjust the amount of the atmosphere entering the negative pressure chamber 18 through the opening 24. Therefore, the control valve 13 is operated by the negative pressure motor 16 of which operation is controlled by the temperature sensitive valve 23 responsive to the temperature of intake air.

If the throttle valve 6 is turned to its opening position after warming-up running of the engine 1, negative pressure in the interior of the intake pipe 2 behind the throttle valve 6 gets higher instantaneously. But the negative pressure motor 16 is never affected by the rising of negative pressure in the interior of the intake pipe 2 behind the throttle valve 6 because of operation of the one-way valve 21.

Moreover, the two invariable orifices 22 and 25 prevent rapid reducing of the pressure in the negative pressure chamber 18 of the negative pressure motor 16 when the negative pressure in the interior of the intake pipe behind the throttle valve 6 is instantaneously reduced, for instance, in engine-brake operation.

Thus, the negative pressure motor 16 is operated only by the temperature sensitive valve 23 irrelatively to the negative pressure in the interior of the intake pipe behind the throttle valve 6 after starting operation of the engine 1.

What is claimed is:

1. An automatic temperature control device for intake air of an internal combustion engine comprising a control valve for adjusting the ratio of the amount of cool air and hot air each supplied into the interior of the intake pipe of the engine, a negative pressure motor for operation of said control valve which negative pressure chamber is, on one hand, in connection with the interior of the intake pipe downstream of a throttle valve, and is, on the other hand, opened into the atmosphere through a temperature sensitive valve operatable according to variation of the temperature of the engine or an adjacent point thereof, an air passage having an one-way valve at an intermediate portion thereof, which permit air to pass therethrough just from the negative pressure chamber of the negative pressure motor to the interior of the intake pipe downstream of the throttle valve, means for preventing rapid reducing of the pressure in the negative pressure chamber of the negative pressure motor against instantaneous variation of the pressure in the interior of the intake pipe behind the throttle valve.

2. An automatic temperature control device for intake air of an internal combustion engine as recited in claim 1 wherein said means for preventing rapid reducing of the pressure in the negative pressure chamber of the negative pressure motor comprises the first invariable orifice interposed in said air passage between the one-way valve and the intake pipe, and the second invariable orifice which makes the air passage between said one-way valve and the first invariable orifice open into the atmosphere therethrough.

* * * * *